United States Patent [19]

Meischen et al.

[11] Patent Number: 6,136,281

[45] Date of Patent: Oct. 24, 2000

[54] METHOD TO CONTROL MERCURY EMISSIONS FROM EXHAUST GASES

[75] Inventors: Sandra J. Meischen, Florence; Vincent J. Van Pelt, Tuscumbia, both of Ala.

[73] Assignee: Tennessee Valley Authority, Muscle Shoals, Ala.

[21] Appl. No.: 09/281,950

[22] Filed: Mar. 31, 1999

[51] Int. Cl.$^7$ ..................................................... B01D 53/64
[52] U.S. Cl. ................. 423/210; 423/240 R; 423/240 S; 422/168; 422/169; 422/177
[58] Field of Search ................. 423/210, 240 R, 423/240 S; 422/168, 169, 177

[56] References Cited

U.S. PATENT DOCUMENTS

| | | | |
|---|---|---|---|
| 3,849,267 | 11/1974 | Hilgen | 423/210 |
| 4,196,173 | 4/1980 | de Jong | 423/210 |
| 4,729,882 | 3/1988 | Ide | 423/210 |
| 5,009,871 | 4/1991 | Higuchi | 423/240 R |
| 5,435,980 | 7/1995 | Felsvang | 423/240 S |
| 5,514,356 | 5/1996 | Lerner | 423/240 S |

*Primary Examiner*—Tom Dunn
*Assistant Examiner*—Peter DiMauro
*Attorney, Agent, or Firm*—Peter D. Olexy

[57] ABSTRACT

The present invention relates to a method to catalyze the oxidation of Hg(0) in a flue gas stream prior to standard emissions control equipment. The oxidized mercury has been found to be more condensable than Hg(0) and consequently more easily removed from the gas phase. Accordingly, mercury in its oxidized form can be trapped from a flue gas stream or the like by absorption onto a solid mass or can be more efficiently removed from flue gas streams by wet processes such as a two-stage wet FGD. The gist underlying the inventive concept of the instant invention relates to the use of a porous bed of gold-coated material that is saturated with Hg(0) to the point that the gold in the presence of HCl in the exhaust stream catalyses the oxidation of Hg(0).

16 Claims, 1 Drawing Sheet

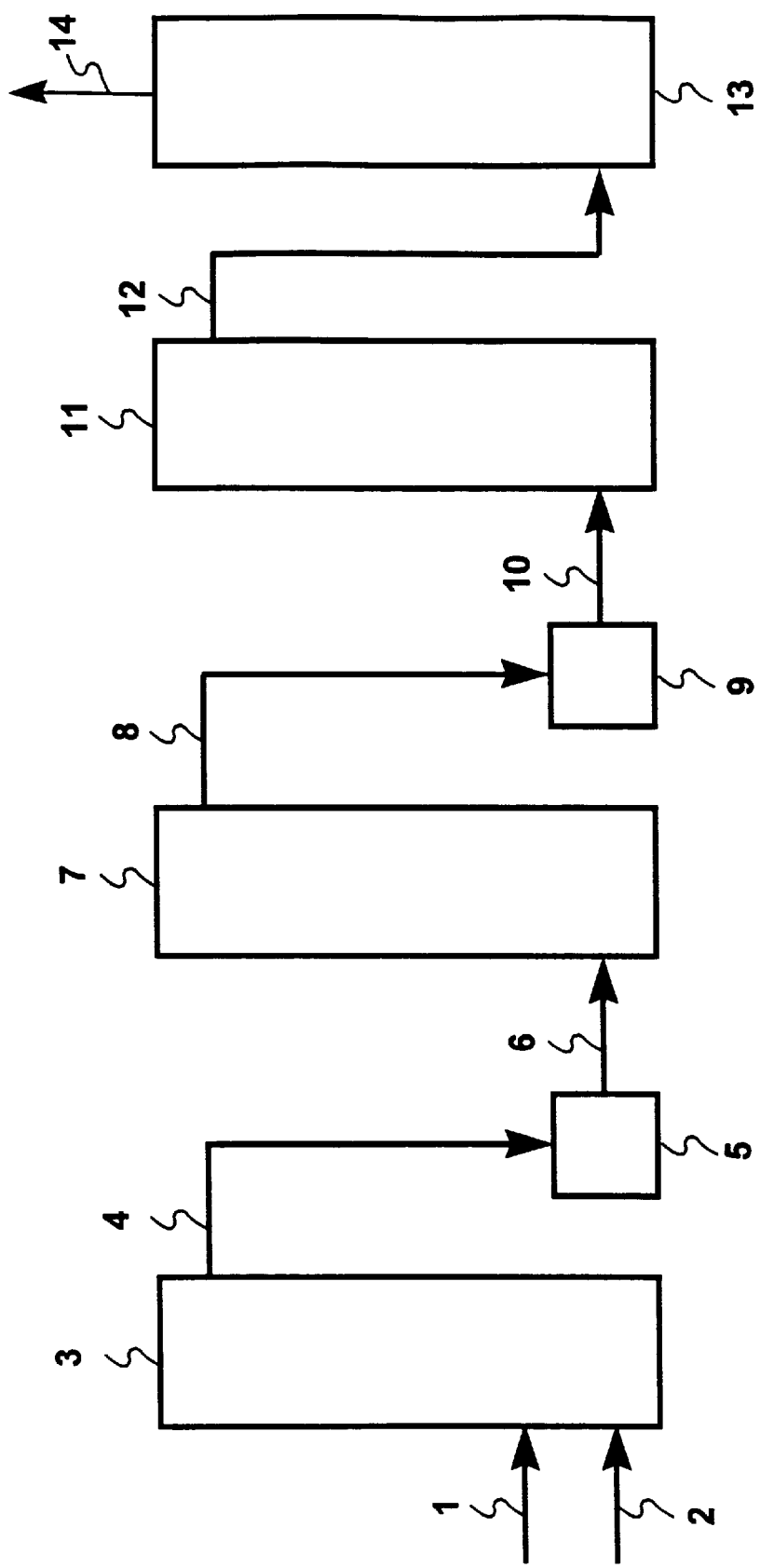

METHOD TO CONTROL MERCURY EMISSIONS FROM EXHAUST GASES

INTRODUCTION

The present invention relates to the control of mercury emitted by combustion sources. Mercury from natural and anthropogenic sources recycles in the environment and collects in terrestrial and aquatic species, ultimately acting as a toxic exposure source in the food web. Mercury was listed as a hazardous air pollutant (HAP) in Title III of the Clean Air Act Amendments of 1990 for which EPA was mandated to evaluate emissions and health risks. The December 1997 release of EPA's 1700-page mercury report has prompted several states to call for mercury control requirements on utilities. The mercury report concluded that more than 85% of all mercury released into the environment by humans is produced by combustion sources. Coal-fired utility boilers are the largest source of mercury emissions in the United States and power plants put out more mercury in the air than any other industry. In February of 1998, EPA issued a report to Congress evaluating toxic air emissions from power plants. The study concluded that utilities are the major remaining source of mercury emissions into the air, with one third of all U.S. emissions coming from coal-fired plants (virtually no mercury is emitted from any other type of power plant). These emissions are not regulated. The report also called for monitoring of power plants to better ascertain the quantity and nature of mercury emissions. A Mar. 19, 1998, report by the Clean Air Network and the U.S. Public Interest Research Group (PIRG) states that the EPA needs to establish target reduction goals for mercury emissions from utility boilers. Regulatory guidelines for mercury and other air toxic emissions have been established for other combustion sources such as municipal waste combustors, medical waste incinerators, hazardous waste combustors, and industrial boilers. More restrictive controls on air toxics will undoubtedly result in higher operational costs for these industries. Accordingly, there exists a real and eminent need for development of a simple, low-cost, technology to control mercury emissions from combustion sources.

BACKGROUND OF THE INVENTION

1. Field of the Invention

This invention relates to an apparatus and process for effecting control of mercury emissions from exhaust gases resulting from the operation of coal-fired and waste combustors. These mercury emissions include elemental mercury [Hg(0)] and oxidized mercury species, usually mercury (II)chloride. Enhanced control of mercury emissions from combustors is directly linked to the proportion of oxidized mercury, i.e. mercury(II)chloride, present relative to elemental mercury in the exhaust gas. The mercury(II) chloride is sorbed more readily than is elemental mercury and thus can be more readily trapped from a flue gas stream or the like by adsorption onto a solid mass or by dissolution in wet processes. Therefore the mercury(II)chloride is subject to removal by conventional pollution control technologies which are currently being used by utilities, incinerators and similar facilities. Elemental mercury, however, is able to evade these control technologies.

In particular, the method of the present invention involves the previously unrecognized property of the noble metal, gold, to amalgamate Hg(0) and upon saturation and in the presence of dilute HCl or $Cl_2$ gas to catalytically oxidize dilute concentrations of elemental mercury [Hg(0)] to mercury(II)chloride in a combustion exhaust gas. This is significant in that, post combustion, the dilute concentrations of Hg(0) and HCl detected in an exhaust gas do not interact measurably in the presence of water vapor at the concentrations typically found in an exhaust gas. However, the aforementioned exhaust gas matrix, when contacted with a noble metal coated substrate preferably a gold-coated substrate, will generate mercury(II)chloride, which thereafter can be removed by conventional pollution control technologies. By this method substantially complete mercury removal can be achieved.

2. Description of the Prior Art

The form of mercury which results as a consequence of a combustion process depends principally on both the temperature and composition of the combusted material. The results of thermochemical calculations show that at the temperatures which are typically found in most combustors, elemental mercury is formed. Nonetheless, such elemental mercury may be, and oftentimes is, converted to other forms of mercury as such elemental mercury is transported from the combustor to the exhaust stack.

The composition of the stack gases determines the distribution between Hg(0) and $HgCl_2$. For example, the primary pollutant in incinerator flue gas is often HCl and combustion systems containing large amounts of chloride in the fuel will convert Hg(0) to oxidized forms of mercury, in particular, mercury(II)chloride [$HgCl_2$]. The dominating pollutant from coal combustion is, however, generally $SO_2$. These and other exhaust gas components affect the distribution of mercury species such that mercury in a municipal incinerator exhaust gas exists primarily as mercury(II)chloride, whereas the mercury content of a coal-fired combustor is primarily elemental mercury.

The effectiveness of mercury control operations depends on the proportion of mercury that is present in the form of mercury(II)chloride. Mercury(II)chloride is more soluble in aqueous solution than elemental mercury and can be removed by wet scrubbing systems. Mercury(II)chloride is also less volatile than Hg(0) and will sorb more readily onto particulates, such as activated carbon.

One approach to achieving an increase in the total removal of mercury, i.e. Hg(0) and $HgCl_2$, from coal-fired and waste combustors is to develop a more effective means to remove Hg(0) since it is the more difficult to remove. One method is to contact an exhaust stream with sorbents that have been chemically modified to promote a reaction with elemental mercury. Revoir et al., U.S. Pat. No. 3,662,523, May 16, 1972, teach one method for improving the removal of Hg(0) from flue gas, by allowing the flue gas matrix to flow through a fixed sorbent bed composed of activated carbon that has been impregnated with halogen or interhalogen compounds. Similarly, Dreibelbis et al., in U.S. Pat. No. 3,194,629, July 1965, teach activated carbon impregnated with potassium triiodine or sulfur removes Hg(0); or Kasai et al., in U.S. Pat. No. 3,876,393, Apr. 8, 1975, teach the use of activated carbon with impregnated sulfuric acid; or Manes et al., in U.S. Pat. No. 3,193,987, July 1965, teach the use of activated carbon impregnated with gold, silver or silver salts, copper or copper salts; or Matviya et al., in U.S. Pat. No. 4,708,853, Nov. 24, 1987, teach the use of molecular sieves impregnated with sulfur; or Ambrosini et al., in U.S. Pat. No. 4,101,631, Jul. 18, 1978, teach the use of zeolites impregnated with elemental sulfur. Alternatively, sorbents to remove Hg(0) may be injected into the flue stream. The impact of an injection of chemically modified sorbents to trap Hg(0) has not been evaluated for electrostatic precipitator (ESP) and baghouse equipment in coal-fired utilities, but sorbent injection has been found to decrease the efficiency of baghouse and ESP equipment in incinerator processes. Additionally, the cost of these impregnated sorbents can be five times that of activated charcoal.

Another approach to increase total mercury removal is to oxidize Hg(0), producing a species that is easier to capture by other emission control directives. It is well-known that $Cl_2$ or HCl readily oxidizes Hg(0), even at room temperature. However, the simple addition of $Cl_2$ or HCl to a flue gas does not lead to the oxidation of Hg(0) to produce $HgCl_2$. The amount of water vapor present in the gaseous matrix absorbs the gaseous $Cl_2$ or HCl and thereby hinders the interaction with Hg(0). Ide et al., U.S. Pat. No. 4,729,882, Mar. 8, 1988, teach a chloride-containing material to be effective in the oxidation of Hg(0) provided the said material is fed into the combustion zone. A process is described in which a chlorine-containing material, such as $Cl_2$, HCl, plastics or salts, is added to a vessel holding the mercury-containing material and the mixture is heated to convert the mercury into mercuric chloride which is removed by scrubbing with wash water. Felsvang et al., U.S. Pat. No. 5,435,980, Jul. 25, 1995, teach that by increasing the chloride concentration to the drying-absorption zone of a spray dryer absorber to a quantity sufficient to oxidize Hg(0) to $HgCl_2$, mercury removal from the flue gas is enhanced. A disadvantage to these processes is that the quantity of HCl or $Cl_2$ which must be added in order to effect the desired degree of oxidation of the Hg(0) in these processes could increase the corrosion downstream therein of the stack associated equipment.

Yet another approach is disclosed by Durham et al., in U.S. Pat. No. 5,409,522, Apr. 25, 1995, which teach that all mercury species in a flue gas can be captured by sorption onto a preferred collection surface and wherein such surface preferably comprises gold. The resulting accumulated mercury can be quantitatively desorbed by heating the gold to temperatures of 700° C. and above. This property is applied in some commercially-available analytical instruments in which the mercury is measured in ambient air. However very little chemistry has been evaluated between mercury and gold under the extremely corrosive conditions found in a flue gas stream. These hostile conditions can result from such factors as the varying concentrations of acid forming flue gas components including hydrogen chloride (HCl) and sulfur dioxide ($SO_2$), which are dependent on combustor loading and the type or source of coal, coupled with the high temperatures usually found in flue gas stacks. For instance, a combination of high moisture levels, i.e. ranging from about 7% to about 10% $H_2O$, in the presence of HCl results in a flue gas which is known to be particularly corrosive. According to Durham et al., '522, supra, the mercury species collected by the gold surface is subsequently regenerated by isolating the surface from the flue gas stream, elevating the temperature of the gold surface from 500° F. to 800° F. (260° C. to 427° C.), preferably from 650° F. to 800° F. (343° C. to 427° C.), to release sorbed mercury in the form of Hg(0) into an input gas stream and subsequently condensing the elemental mercury vapor at a temperature below its dew point. However, previous investigations on the collection of mercury(II)chloride by gold surfaces (F. Slemr, W. Seiler, C. Eberling and P. Roggendorf, "The Determination of Total Gaseous Mercury in Air at Background Levels," *Anal. Chim. Acta*, Vol. 110, p. 35, 1979) indicated that only about 50% of $HgCl_2$ was released at 700° C. as Hg(0). Consequently the presence of mercury(II)chloride in the flue gas can further complicate such use of gold due to the uncertainty of its interaction therewith. It is also known that chlorine reacts with gold at temperatures up to about 300° C. to form gold monochloride. Indeed, this phenomenon is utilized in the recovery of gold from gold alloys, U.S. Pat. No. 5,004,500, Dunn et al., Apr. 2, 1991. Similar gold reactions occur in the presence of HCl gas.

U.S. Pat. No. 5,750,992, Van Pelt el. al., May 12, 1998, assigned to the assignee of the instant invention, discloses a method for the measurement of elemental mercury in a flue gas. There are components in the flue gas that interfere with Hg(0) measurement. To eliminate these, the flue gas (which has been dewatered to remove most of the HCl and $HgCl_2$ present) is passed through a gold cartridge which removes only Hg(0) and creates a reference gas that makes possible the measurement of Hg(0) in flue gas. We noted the time required to saturate a gold-coated sand with Hg(0) from a simulated flue gas which contained HCl gas was apparently infinite. By reducing the HCl gas concentration to 0 ppm in the simulated flue gas stream, an immediate increase of the Hg(0) concentration in the simulated flue gas stream was monitored by a UV photometer. Upon re-addition of the HCl gas to the simulated flue gas stream the Hg(0) absorption disappeared. We determined thereafter that during the saturation of the gold by Hg(0), an interaction of Hg(0) with the HCl occurred in the simulated flue gas that resulted in the oxidation of Hg(0) to $HgCl_2$. The $HgCl_2$ was desorbed into the gas matrix and undetected by the UV photometer. These data suggest that Durham, '522, supra, should present mercury collection problems under conditions that may be used in their patent.

In view of the consideration of the problems enumerated, supra, it should now be readily appreciated by those skilled in this art that there still exists a definite need for the development of a new, cost-effective and efficient method which will allow for the removal of mercury species, which are contained in flue stack gas streams normally emitted from waste and fossil-fueled combustors, including power plants, so as to reduce or substantially reduce the emissions to the environment of mercury from such combustors.

SUMMARY OF THE INVENTION

The present invention relates to a new and novel apparatus and process for effecting the removal of mercury from a stack gas by the catalytic oxidation of elemental mercury [Hg(0)] within an exhaust gas matrix to mercury(II)chloride [$HgCl_2$]. Significantly, mercury(II)chloride is more water-soluble and less volatile than Hg(0) and consequently is more easily removed from gaseous streams by existing wet flue gas desulfurization (FGD) systems, such as a wet limestone scrubber and FGD spray dryers or a wet electrostatic precipitator (ESP). The instant, new, and novel invention is substantially more effective in promoting the removal of substantially complete mercury without the complicated and costly injection of large amounts of activated or treated carbons to remove small concentrations of mercury.

The instant, new, and novel invention is based on the previously unrecognized property of the noble metals, preferably gold, in the presence of a gaseous matrix wherein there exist water vapor and dilute Hg(0) and dilute HCl to oxidize Hg(0) to mercury(II)chloride.

OBJECTS OF THE INVENTION

It is therefore the principal object of the present invention to provide a means which can lead to the substantial elimination of mercury in flue gas emissions.

Another object of the present invention is to provide for a novel and improved process for the noble metal catalyzed oxidation of Hg(0) in an exhaust gas containing HCl to HgCl$_2$ that is more easily collected and removed from flue gas mixtures by common pollution control technologies such as wet FGD.

A further object of the instant invention is to provide a process which uses a catalyst whereby a relatively simple catalytic oxidation of Hg(0) can be effected in a variety of combustion facilities and in particular a coal-fired combustor, where this simple catalytic oxidation can be carried out without the removal of water vapor from the flue gas, and further wherein the water soluble mercury(II) chloride generated will continuously evolve from the surface of the catalyst coated carrier material of the present invention without the need for any separate, complicated removal steps.

Still yet a further object of the present invention is to provide a process where there is no need for the use of a separate carrier gas to remove the products resulting from the oxidation of Hg(0), as has sometimes been necessary with prior art processes.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWING

The present invention, together with further objectives and advantages thereof, will be better understood from a consideration of the following description taken in connection with the accompanying drawings and examples in which the FIGURE is a flowsheet generally illustrating the principles of our new and novel method for enhancing the removal of total mercury from flue gas streams.

Referring now more specifically to the FIGURE, conduit 1 delivers combustible material to combustor 3. Conduit 2 delivers air to combustor 3. Combustor 3 can be a steam boiler or a waste incinerator. Induced draft fan 5 pulls the flue gas generated by combustor 3 through conduit 4 and delivers it via conduit 6 to particle removal device 7. Particle removal device 7 can be a baghouse or an electrostatic precipitator which removes the particulate matter from the flue gas generated by combustor 3. The flue gas exiting particulate removal device 7 is delivered through conduit 8 to catalyst bed 9 wherein the elemental mercury and HCl in the flue gas are converted to mercury(II)chloride by interacting with the noble metal surface of a noble metal coated substrate. The catalyst bed which contains the noble metal coated substrate could be retrofitted close to the exit duct of a baghouse or ESP chamber. Alternatively, the baghouse or ESP chamber could be extended to include the catalyst bed or the catalyst bed could be a stand alone chamber. The geometry of the chamber would conform to the flue stack such that the flue gas would pass through the chamber. The temperature of the catalyst bed would be at the ambient temperature of the flue gas as the flue gas passes through catalyst bed 9. The flue gas containing the mercury oxidized to mercury(II)chloride is delivered through conduit 10 to a wet FGD or wet scrubber or spray-dryer absorber 11 where the mercury(II)chloride is scrubbed from the flue gas. Conduit 12 delivers the clean flue gas to stack 13 for discharge to atmosphere 14.

DESCRIPTION OF THE PREFERRED EMBODIMENTS

The present invention utilizes the properties of a noble metal, preferably gold, to 1) amalgamate elemental mercury, and to 2) interact with HCl or Cl$_2$ on the noble metal, preferably gold, surface wherein the oxidation of Hg(0) to mercury(II)chloride is catalyzed and mercury(II)chloride is released from the gold surface into the exhaust gas. The instant new, novel, and unique invention, including methods, means, processes and techniques is based on the discovery that a noble metal, preferably gold, surface will selectively catalyze dilute (0.1 to 100 ppb) concentrations of Hg(0) to Hg(II) in a flue gas matrix or the like containing at least about 20 ppm HCl gas. Further, it has been found that other components which are in the flue gas, e.g. NO$_2$, SO$_2$, may enhance the oxidation process.

For brevity, hereafter the noble metals are often simply exemplified by reference to gold. Gold was the noble metal used in the EXAMPLES. However, the discussion herein is meant to apply with equal force to the other noble metals unless otherwise indicated.

It is our current belief that the present invention should find application with any flue gas stream containing Hg(0) and a source of chlorine such as HCl or Cl$_2$ since all of the essential materials necessary for the catalyzed oxidation reaction of the present invention will then be present. For brevity, however, the discussion herein is often simply in terms of "HCl."

In order to achieve the foregoing and other objects of the instant invention, the present invention provides a method and means for oxidizing Hg(0) in flue gases and subsequently removing the oxidized mercury, including a process comprising: (a) passing the flue gas stream through a vessel containing a gold-coated particular material; (b) saturating the surface of such gold with mercury; (c) interacting the absorbed mercury on the gold with gases in the flue mixture, such as HCl, to oxidize Hg(0); and (d) collecting the oxidized mercury by standard emissions control methods. Saturation is the point at which the maximum amount of Hg(0) under the prevailing conditions is absorbed by the gold surface. At this point we believe an equilibrium is established between the processes of oxidation/release of HgCl$_2$ and Hg(0) absorption.

The catalyst or catalyst means to oxidize the elemental mercury in an exhaust stack to mercury(II)chloride can be incorporated into existing flue stacks.

Operation within the flue stack would include (a) an exhaust gas from a combustor (gas matrix) passing through a conduit to a particulate removal device fixed within the conduit to remove particulates from the gas matrix, (b) the gas matrix moving downstream of the particulate removal device and passing through a fixed or a recirculating catalyst bed that would interact with Hg(0) and HCl to form mercury (II)chloride, and (c) the gas matrix containing the mercury (II)chloride flowing through the conduit downstream of the catalyst bed to a means, such as a wet FGD system, to remove mercury(II)chloride.

The particulate removal device, such as a bag filter or electrostatic precipitator, functions to minimize particulate contamination of the catalyst bed. For particulate removal by a bag filter, the filter should have a pore size smaller than the particulates found in the input gas stream.

The improved system of the present invention contains a particulate removal means, a mercury oxidation means and a wet scrubbing mercury removal means. The particulate removal means such as a filter or ESP must remove particulates to prevent coating of the catalyst.

The mercury(II)chloride formed and evolved from the catalyst surface can be removed from the exhaust gas by dissolution into the aqueous phase of an FGD scrubber or wet scrubber or FGD spray dryer.

Operating temperatures should be at the temperature of the stack and preferably not more than about 275° C. The mercury(II)chloride formed and evolved from the catalyst surface can then be removed from the exhaust gas by dissolution into the aqueous phase of conventional FGD scrubbers or wet scrubbers or FGD spray dryers.

At temperatures about 300° C., possibly formation and volatilization of gold trichloride might be encountered. As a consequence, we chose a maximum temperature of about 275° C. so as to be conservative. If no problems are encountered at temperatures higher than about 275° C., such higher temperature may be used, of course. Typically the temperature in the flue gas stack after particles removal would be on the order of about 170° C., to the best of our knowledge, but this is not a limiting or especially important factor in the present invention.

The pressure of operation is not an overly important factor in accordance with the present invention since the pressure is simply the pressure which is encountered in the normal operation of the flue gas stack. Most typically this is on the order of about one atmosphere, however.

The exact time of contact between the flue gas and the catalyst coated carrier of the present invention on an industrial scale would, of course, be an engineering determination. In our tests as later shown in the EXAMPLES, we found a conversion of Hg(0) to be immediate at 2 L/min over 0.75 gm of gold-coated sand. It would be a simple matter for one of ordinary skill in the art to determine the amount of gold-coated material required to ensure the desired degree of conversion without interfering with flow through the flue gas stack using conventional techniques well known in the art. See especially EXAMPLES III and IV, later presented.

Consequently, Hg(0) in the raw flue gas can be oxidized and the oxidized mercury removed by standard emissions control processes which will either condense onto solid surfaces or solubilize in aqueous solution such oxidized mercury. The practice of the instant invention is carried out with a system comprising a gold-coated substrate which catalyzes the reaction of Hg(0) in the flue gas with HCl and/or other gases in the flue gas matrix.

The catalyst bed may be supported by a screen or screens inserted horizontally to traverse the conduit wherein the exhaust gas flows. If the catalyst bed is comprised of screens these may be mounted in a series within the conduit. Any conventional means of insuring gas contact with a catalyst can be used in accordance with the present invention. The embodiments disclosed herein reflect those which we believe will be most economical with what we typically term a flue gas generated from a coal-fired combustor or waste combustor.

For example, one could contemplate using a screen, gauze or mesh material to retain the catalyst coated carrier material in any location which permits the catalyst coated carrier material to be contacted with the flue gas to effect the oxidation reaction of the present invention, the catalyst coated carrier material could be adhered to the walls of the flue gas conduit, etc. The exact placement of the catalyst coated carrier material of the present invention in the flue gas stack is not overly important so long as there is adequate contact between the flue gas and the catalyst coated carrier material to effect the desired oxidation of Hg(0) to species such as mercury(II)chloride.

The catalyst or catalyst means of the present invention is typically a solid which has been coated or impregnated with a noble metal. The catalyst or catalyst means can also include a fixed or recirculating bed of granular solids. The solids are comprised of a carrier material coated with a noble metal. The carrier material can include silicon oxides, ceramics, glasses, glass bonded ceramics, metals, zeolites, organic polymers, resins, spun materials, metal sinters, silicas, aluminas and combinations thereof. The form of the noble metal-coated carrier material can include beads, briquettes, tellerettes, raschig rings, berl saddles, spun material, or screens such that there exists a high surface area for contact with the exhaust gas and minimal flow restriction through the catalyst bed. A pressure drop across the catalyst bed should be less than one inch of water. Suitable noble metal coatings must collect mercury and include gold, silver, palladium, platinum, copper and mixtures thereof. The noble metal-coated surface must be capable of promoting the interaction between Hg(0) and HCl or $Cl_2$ in order to catalyze the formation of mercury(II)chloride. Gold is the noble metal of choice.

The preferred catalyst surface is a noble metal, most preferably gold, at a thickness of from about 2 to about 40 microns. At a thickness range as above, the catalyst coated carrier material of the present invention should how an adequate mercury absorption capacity for use in combination with flue gases as are commonly encountered, for example, from utility combustors. There appear to be two competing factors involve din selecting the thickness of the catalyst which is coated on the carrier material, and these factors permit some flexibility outside the above range, as now explained. If the catalyst coating is too thin, i.e., excessively below 2 microns in thickness, then the catalyst coating would almost certainly be removed under the conditions encountered during the treatment of the flue gas in accordance with the present invention where the ambient flue gas conditions can be extremely corrosive. On the other hand, if the catalyst coating is greatly in excess of 40 microns, not only is cost increased but since we currently believe that mercury atoms dissolve din the surface of the catalyst coating and the oxidation reaction of the present invention is believed to basically be a surface reaction, the inner or deeper parts of catalyst coating will not be an effective factor in the oxidation reaction of the present invention and will simply lead to increased cost.

A typical flue gas matrix from fossil fuel and waste combustion processes will contain compounds such as $NO_x$, $O_2$, $H_2O$, $CO_2$ and CO. Other gases such as $SO_2$, HCl, $Cl_2$, $H_2S$ and $NH_3$ and volatile metals and organics may also be present, depending on the type of fuel combusted. Flue gases of coal combustors typically contain $O_2$, $CO_2$, CO, NO, $NO_2$, $SO_2$, HCl, $N_2O$, $H_2O$ and mercury species as well as many trace components. Coal-fired utility flue gas usually contains sulfur dioxide as a congeneric impurity, typically in an amount of from about 100 ppm to about 1500 ppm. Further, the concentration of $NO_2$ in a coal-fired utility flue stack gas typically ranges upward to 50 ppm, with the minimum concentration commonly encountered being about 20 ppm. As will be seen from later presented EXAMPLE IV, for reasons not entirely clear, the presence of such sulfur dioxide and $NO_2$ can lead to improved effects obtained in accordance with the present invention in the oxidation of Hg(0) to mercury(II)chloride.

For example, depending on the source of coal, it would not be unusual for a typical coal-fired raw flue gas composition to contain the following components:

| Component | Percent (vol. %) | Component | mg/m$^3$ | Component | ug/m$^3$ |
|---|---|---|---|---|---|
| $N_2$ | 70 | $NO_x$ | 400–800 | Hg | 1–10 |
| $O_2$ | 4–6 | $SO_2$ | 500–3000 | | |
| $H_2O$ | 7–9 | HCl as Cl | 20–160 | | |
| $CO_2$ | 14 | | | | |

Typically $NO_X$ is NO and/or $NO_2$ and/or $N_2O$ or any combination thereof.

The substrate for the catalyst surface must be stable at the conditions of the flue stack and must be in a shape such that there exists a high surface area for contact with the exhaust gas and minimal flow restriction through the catalyst bed. As earlier indicated, pressure drop across the catalyst bed should be less than one inch of water. The geometry of the catalyst bed should conform to the flue stack such that all flue gas would pass through the bed. The size and shape of the substrate would determine the weight percent of gold necessary to coat the substrate. Since we believe the primary function of the carrier (or substrate) in accordance with the present invention is simply to hold the catalyst coating thereon for adequate contact with Hg(0) in the flue gas stream, the only important factor is that the substrate have a surface area sufficiently high so that the Hg(0) can quickly contact large areas of the catalytic coating and the Hg(0) can be oxidized to mercury(II)chloride. While we have not quantified this parameter, we generally expect that carrier materials having a surface area per volume of catalyst bed of from about 100 to about 5300 square feet per cubic foot of bed should function quite well, etc.

Of course, the carrier material of the present invention must thermally stable at the conditions of the process of the present invention, but materials such as carbons, zeolites, ceramics, spun material, metal sinters, aluminas and mixtures thereof almost invariably show an adequate thermal stability at the temperatures used in the process of the present invention, and one or ordinary skill in that art should easily be able to select the most appropriate carrier material for use in the particular process under consideration.

In the case of gold-coated sand use din our tests about 0.005 weight percent is gold. The contact time and conversion rate will depend on the size and shape of the gold-coated substrate and concentration of Hg(0) and HCl in the flue stack.

There appears to be no special criticality to the exact method used to deposit the catalyst metal on the carrier, although as will be apparent to one of ordinary skill in the art, it is necessary, for economic reasons, to ensure good adherence of the catalyst metal to the carrier so that catalyst metal is not removed with the exit flue gas after oxidation of the Hg(0) to mercury(II)chloride. Conventional methods of depositing a catalytic metal can be used, e.g., deposition from a solution or slurry, solvent evaporation, reduction to the metal form (chemical or thermal), chemical vapor deposition, electroless plating, electrolytic plating, vacuum deposition, etc. This is a conventional aspect of the present invention and may be freely varied. Currently, it appears the most preferred catalyst coated carrier materials can be formed most easily by vacuum deposition. One such product is commercially available under the trade name Brooks Rand. For use in combination with an utility flue gas stack, the catalyst coated carrier material will probably turn out to be gold-coated spun glass because of the low back pressure encountered upon the use of the same. The best substrate to date, however, has been sand which has been gold coated.

The size of the catalyst bed would be determined by the total amount of mercury to be oxidized by the chosen catalyst geometry. The catalyst bed may be supported by a screen inserted horizontally to traverse the conduit. If the catalyst bed is comprised of screens these may be mounted in a series within the conduit.

As will be apparent to one of ordinary skill in the art, the carrier generally will be one which is chemically inert during use in the process of the present invention and the carrier should be thermally stable during use in the process of the present invention, i.e., should not excessively deform or be excessively degraded during such use. Of course, the carrier should have no adverse effect on the catalyst during use.

The mercury oxidation efficiency in accordance with the present invention will, of course, depend upon the temperature of the catalyst coated carrier material. This temperature has been earlier discussed and while the maximum preferred temperature is set based upon a consideration of factors such as the temperature of most flue gases, in the case of selecting a thermally stable carrier material, as a practical material seldom if ever will temperatures below about 70° C. be encountered in the process of the present invention. The degree of surface saturation of the catalyst is also important and this has earlier been discussed.

With respect to the amount of the catalyst coated carrier material used with reference to the amount of mercury species in the flue gas, this is best discussed in terms of the amount of catalyst and the amount of Hg(0), and these factors have earlier been discussed. This is because the amount of catalyst, typically gold, and the amount of Hg(0) in the flue gas stream, will generally be the most important factors impacting this particular aspect of the present invention since there generally will be more than an adequate amount of chlorine present to form the mercury(II)chloride, whether the same is in the form of HCl or $Cl_2$.

We expect successful long-term operation with the catalyst coated carrier material of the present invention, and believe that a regular heating interval to rejuvenate the gold affinity for mercury can easily be incorporated into the design of the present invention to increase the life-span of the catalyst coated carrier material. In many instances, however, such a regeneration may not be desirable or may not be practical.

In order to practice the instant invention, a system was devised to carry out the tests necessary therefore. Accordingly, one embodiment of such a system can comprise: a combustor such as a boiler or waste incinerator, which produces a flue gas. During normal operations the flue gas is transported from the combustor to the particulate removal unit where the particulate matter is removed. After the particulate matter is removed, the flue gas is transported to the catalytic oxidizer comprised of the gold-coated substrate where the Hg(0) is converted to $HgCl_2$. The flue gas is then transported to the flue gas desulfurization unit such as a wet limestone scrubber where the $SO_2$ and $HgCl_2$ is removed. The clean flue gas is then transported to a stack for discharge into the atmosphere.

Our work at temperatures below 300° C. on simulated flue gases shows that $HgCl_2$ is formed in the presence of Au(0), Hg(0) and HCl gas. Typically, the environment of a coal-fired boiler exhaust gas with 7% to 10% water vapor interferes with the interaction of HCl with Hg(0) and consequently there is no noticeable production of mercury(II)

chloride. However, in the presence of a device that constrains a high-surface area material or recirculates a high surface area material consisting of a gold-coated support substance, the interaction of Hg(0) with HCl occurs with subsequent oxidation of Hg(0) to $HgCl_2$. The support substance sans gold does not promote the interaction, consequently the gold presence is essential for the Hg(0) oxidation to $HgCl_2$ to occur in the presence of HCl.

While not wishing to be bound by any theory, it is believed that Hg(0) in the gas stream is absorbed by amalgamation of the mercury atoms with a metal that is part of the catalyst surface. The catalyst surface can be one or more noble metals such as the noble metals selected from gold, silver, palladium, platinum, copper and mixtures thereof. Gold is the most preferable because of its high affinity for mercury and the ease with which films can be applied to a variety of surfaces. While it is generally inert to most other compounds in the input gas stream, gold can interact with HCl up to temperatures of 300° C. to form gold monochloride. It is believed that the noble metal surface which amalgamates Hg(0) also interacts with HCl in the flue gas stream to form a noble-metal-chloride intermediate in prelude to the formation of the $HgCl_2$. It's believed these two interactions, mercury amalgamation and formation of the noble-metal-chloride, may concentrate the relatively dilute mercury and chloride on the catalyst surface which promotes the formation and subsequent volatilization of $HgCl_2$.

EXAMPLES

In order that those skilled in the art may better understand how the present invention can be practiced, the following examples are given by way of illustration only and not necessarily by way of limitation, since numerous variations thereof will occur and will undoubtedly be made by those skilled in the art without substantially departing from the true and intended scope and spirit of the instant invention herein taught and disclosed.

The measurement of the Hg(0) concentration in tests comprising the following examples was accomplished with a UV photometer, AMETEK model 4000 photometric analyzer. The elemental mercury, Hg(0), concentration can be monitored at a 254 nm wavelength. Oxidized mercury, such as mercury(II)dichloride, is not UV detectable. The gas flow through the UV photometer was adjusted to 2 L/min. of dry gas matrix. The gas flow was caused to flow directly through a vessel comprised of a borosilicate tube about 6 mm in diameter and 4 cm long containing washed sea sand, either uncoated or gold-coated, as described in each example, which is held in place with glass wool plugs. The gold-coated sea sand consisted of sea sand coated with about 0.005% by weight gold compared to the weight of the said sand. The vessel as constructed and containing the described contents acts as a Hg(0) filter and oxidative catalyst but hereafter will be referred to as a vessel. The vessel was heated to 70° C. in order to prevent the accumulation therein of moisture. The water vapor in the gas matrix after passing through the vessel was condensed from the effluent and removed with a Baldwin sample conditioning unit prior to Hg(0) measurement.

Example I

The measuring instrument and conditions used herein were as previously described.

EXAMPLE I illustrates that the surface of a washed ignited sand, sans a gold coating, does not promote the interaction of Hg(0) with HCl to form mercury(II)chloride in a gaseous matrix comprised of Hg(0) at 0.9 ppb (NIST mercury permeation source), HCl at 140 ppm, $H_2O$ at 100,000 ppm and $N_2$ to make up a total dry gas flow of 2L/min. The gas was caused to flow directly through a vessel containing 1 gram of washed ignited sand.

Throughout the 4-hour test, the effluent from the vessel contained a Hg(0) concentration measured at 0.9 ppb consistent with the 0.9 ppb Hg(0) concentration in the influent. There was no indication of an interaction between Hg(0) and HCl upon passing through the vessel.

Example II

The same measuring instrument described above was used in the conduct of tests comprising this example.

EXAMPLE II illustrates the effect of HCl in a gaseous matrix on the measurement of Hg(0) after the gaseous matrix has passed through a vessel containing the gold-coated sea sand in which the gold was presaturated with Hg(0).

The term "breakthrough time," as used herein means and is intended to mean the time it takes the vessel to become saturated with Hg(0) and begins to pass through the vessel, rather than being trapped therein. The saturation, although substantially contributed by Hg(0) may also be attributed to poisoning of the noble metal surface by other materials such as HCl.

A gas matrix comprised of Hg(0) at 1.6 ppb (NIST mercury permeation source), $H_2O$ at 100,000 ppm and sufficient $N_2$ to make up a total flow of 2L/min. was caused to flow directly through a vessel containing 0.759 gram of gold-coated sea sand.

The baseline Hg(0) concentration measured with a flow of $N_2$ and 10% $H_2O$ vapor through the vessel then through the photometer was 0.02 ppb of Hg(0). Elemental mercury was added to the gaseous matrix to bring the concentration therein up to 1.6 ppb. The measured Hg(0) concentration continued to read 0.02 ppb which indicated that the gold-coated sea sand was collecting the Hg(0). After two hours the baseline began to rise and within six hours after the test began, breakthrough of the Hg(0) was complete (the gold coat was saturated with Hg(0)) and the measured concentration of Hg(0) concentration rose to 1.6 ppb. After such saturation of the gold-coated sand with Hg(0), sufficient HCl was added to the gaseous mix to bring its concentration therein up to 140 ppm. Thereafter the observed concentration of Hg(0) initially dropped to 0.6 ppb and thereafter rose, within an hour, to 1.2 ppb where it remained for the next 11 hours. When the HCl was removed from the gaseous mix, the concentration of Hg(0) initially rose to 1.8 ppb and then dropped to 1.6 ppb within the hour. When the Hg(0) was removed from the gaseous mixture the mercury concentration dropped to 0.4 ppb in one hour, to 0.2 ppb in four hours after removal of such Hg(0), and subsequently, some eight hours after such removal, the Hg(0) concentration dropped to 0.1 ppb. The results indicate that Hg(0) saturated gold surface will interact with dilute gaseous HCl to enhance the oxidation of elemental mercury most probably to mercury (II)chloride.

Example III

The same measuring instrument described above was used in the conduct of tests comprising this example.

EXAMPLE III illustrates the effect of a gold-coated sea sand on the measurement of Hg(0) by a gaseous matrix comprised of Hg(0) at 1.6 ppb (NIST mercury permeation source), HCl at 140 ppm, $H_2O$ at 100,000 ppm and sufficient $N_2$ to make a total dry gas flow rate of 2L/min. The gas matrix was caused to flow directly through a vessel containing 0.756 gram of gold-coated sea sand.

For this test a baseline measurement of 0.04 ppb of Hb(0) was produced by the flow of $N_2$ and gaseous $H_2O$ through the vessel and subsequently through the measurement photometer. The concentration of Hg(0) gas was increased from 0 to 1.66 ppb and the concentration of HCl gas was increased from 0 to 140 ppm in the gaseous matrix. The measured Hg(0) concentration continued to read 0.04 ppb. In about two hours the Hg(0) concentration began to rise and within six hours after the teat began the Hg(0) measured 1.2 ppb where it remained for the next 10 hours. Subsequently, the HCl content of the gas matrix was reduced from 140 ppm to 0 ppm and the Hg(0) measurement immediately increased from 1.2 ppb to 2.1 ppb Hg(0) and thereafter dropped within an hour to 1.7 ppb Hg(0). This observed 0.4 to 0.5 ppb difference in the Hg(0) measurement upon removal of HCl from the gas matrix suggests an oxidation-reduction equilibrium had been established during the test and the difference i mercury readings is a measure of the oxidation rate under the experimental conditions of this test.

Example IV

The same measuring instrument described above was used in the conduct of tests comprising this example.

Example IV illustrates the effect a vessel containing 0.74 gram of gold-coated sea sand has on the measurement of Hg(0) in a simulated flue gas.

The simulated flue gas was comprised of Hg(0) at 0.9 ppb (NIST mercury permeation source), $SO_2$ at 800 ppm, HCl at 140 ppm, $H_2O$ at 100,000 ppm, $O_2$ at 70,000 ppm, $CO_2$ at 140,000 ppm and balance $N_2$ to make up a total flow of dry gas matrix of 2L/min. The simulated flue gas was caused to flow directly through the vessel containing 0.74 gram of gold-coated sea sand.

The test lasted approximately 46 hours. There was no evidence, as measured by the UV photometer, of breakthrough of the Hg(0) by the vessel. On reducing the HCl concentration from 140 ppm to 0 ppm in the simulated flue gas and readjusting the flow to 2L/min with $N_2$, the Hg(0) concentration began to rise and registered at 0.8 ppb Hg(0) within two hours. This result implied that during the test Hg(0) breakthrough of gold-coated sea sand had occurred but that the oxidation equilibrium established between Hg(0), HCl and gold to form mercury(II)chloride was sufficient to obscure breakthrough.

Additional HCl, if required, to oxidize Hg(0) to $HgCl_2$ could be injected directly into the catalyst bed.

We found in Example III that the 50 mg of Au on 0.76 grams of gold-coated sea and oxidized about 7 ng Hg per minute at 1.6 ppb of Hg(0) and 140 ppm HCl whereas in this Example, 15 ng Hg(0) per minute is oxidized at a concentration of 0.9 ppb Hg(0) and HCl concentration of 140 ppm in the presence of other flue gas components. The complex flue gas matrix may enhance the catalytic reaction.

The data suggest that once gold becomes saturated with elemental mercury an equilibrium is established in which elemental mercury is oxidized by chloride, typically provided by HCl, and released. It is believed that the gold surface acts by concentrating the relatively dilute Hg(0) and brining it into intimate contact with chloride resulting in the oxidation of Hg(0) and the release of $HgCl_2$ from the gold surface. This catalytic effect of gold on the reaction of Hg and $Cl_2$/HCl has not been published.

INVENTION PARAMETERS

After sifting and winnowing through the data herein presented, as well as other results and operations of the instant new, novel, and improved technique, including methods and means for the effecting thereof, the operating variables, including the acceptable and preferred conditions for carrying out the instant invention are below.

| VARIABLES | OPERATING LIMITS | PREFERRED LIMITS | MOST PREFERRED LIMITS |
|---|---|---|---|
| Temperature of oxidizing means | about 20–about 275° C. | 70–175° C. | 70–175° C. |
| Hg(O) Concentration | about 0.1–about 500 ppb | about 0.5–about 100 ppb | 0.5–10 ppb |
| HCl Concentration | 20–200 ppm | 20–200 ppm | 20–200 ppm |

In its most preferred form, the oxidizing means is the catalyst bed which comprises a noble metal coated on a substrate.

While we have shown and described particular embodiments of this invention, modifications and variations thereof will occur to those skilled in the art. It is to be understood therefore that the appended claims are intended to cover such modifications and variations which are within the true scope and spirit of this invention.

What we claim as new and desire to secure by Letters Patent of the United States is:

1. A system for removing mercury from a flue gas stream comprising:
   a channeling means to direct the flow of the flue gas;
   an oxidizing means to convert Hg(0) to $HgCl_2$ in a flue gas exiting from a combustion furnace;
   a scrubbing means to remove from the flue gas the $HgCl_2$ formed, wherein the oxidizing means is a noble metal coated substrate.

2. The system of claim 1, wherein the flue gas stream contains Hg(0) and HCl or $Cl_2$ gas.

3. The system of claim 1, wherein the noble metal is selected from the group consisting of gold, silver, palladium, platinum, copper and mixtures thereof.

4. The system of claim 1, wherein the noble metal is gold.

5. The system of claim 1, wherein the substrate is selected from the group consisting of silicon oxides, ceramics, glasses, glass bonded ceramics, metals, zeolites, organic polymers, resins, and mixtures thereof.

6. The system of claim 5, wherein the substrate is in the form of beads, briquettes, tellerettes, raschig rings, berl saddles, metal sinters, spun material, or a screen such that there exists a high surface area for contact with the exhaust gas and minimal flow restriction through the noble metal coated substrate.

7. The system of claim 1, wherein the channeling means is existing duct work connecting to a wet scrubber.

8. The system of claim 7, wherein the wet scrubber is a wet limestone scrubber, a wet ESP, a wet Venturi scrubber, or a polishing wet scrubber.

9. A process for recovering mercury from a flue gas stream, wherein the flue gas stream comprises Hg(0) and a source of chlorine, which comprises:

passing the flue gas through a particle removal means;

contacting the flue gas with a catalytic oxidizing means wherein the Hg(0) is oxidized by the catalytic oxidizing means and reacts with the source of chlorine to form $HgCl_2$, whereafter the flue gas stream is scrubbed to remove the $HgCl_2$ from the flue gas stream; and venting the flue gas stream to the atmosphere, wherein the catalytic oxidizing means is a noble metal coated substrate.

10. The process of claim 9, wherein the source of chlorine is HCl or $Cl_2$.

11. The process of claim 10, wherein the source of chlorine is HCl.

12. The process of claim 9, wherein the temperature of the oxidizing means is from about 20° C. to about 275° C., the Hg(0) concentration is from about 0.1 ppb to about 500 ppb, and the HCl concentration is 20 ppm to 200 ppm.

13. The process of claim 9, wherein the noble metal is selected from the group consisting of gold, silver, palladium, platinum, copper and mixtures thereof.

14. The process of claim 13, wherein the temperature of the oxidizing means is 70° C. to 175° C., the Hg(0) concentration is from about 0.5 ppb to about 100 ppb, and the HCl concentration is 20 ppm to 200 ppm.

15. The process of claim 9, wherein the noble metal is gold.

16. The process of claim 15, wherein the temperature of the oxidizing means is 70° C. to 175° C., the Hg(0) concentration is 0.5 ppb to 10 ppm, and the HCl concentration is 20 ppm to 200 ppm.

* * * * *